Patented Nov. 27, 1934

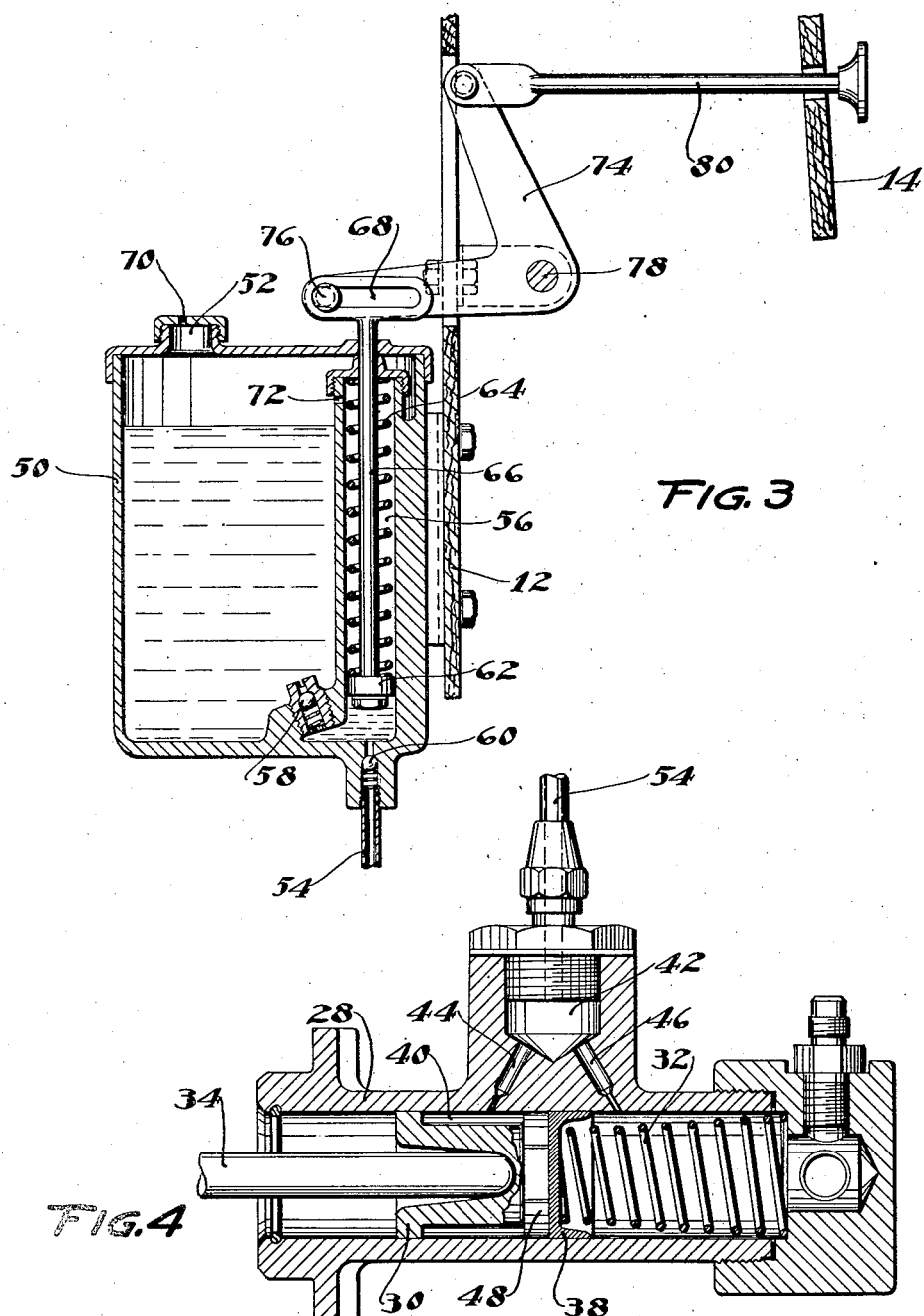

1,981,961

UNITED STATES PATENT OFFICE 1,981,961

BRAKE

John P. Mahoney, South Bend, Ind., assignor to Bendix Brake Company, South Bend, Ind., a corporation of Illinois Application February 5, 1931, Serial No. 513,497

2 Claims. (Cl. 60—54.6)

This invention relates to brakes, and is illustrated as embodied in a system of four-wheel hydraulic or other fluid-operated brakes.

An object of the invention is to keep a pressure on the fluid lines, to obviate sucking air and to make sure that the lines are kept full of fluid by simple means such as a spring-actuated piston which is preferably arranged in the supply reservoir which is ordinarily mounted on the dash. Among other advantages, this permits the use of a novel simplified master clyinder, with simple straight passages without valves or other restrictions.

I also prefer to provide an operating linkage for the pressure piston or its equivalent, which linkage extends to the instrument board or other position where it can be readily observed and operated by the driver. This has the additional advantage to the driver that in case of a complete failure of the fluid lines, he is at once warned by the abnormal position of the piston linkage.

The above and other objects and features of the invention including various novel combinations and desirable specific constructions, will be apparent from the following description of the illustrative embodiment shown in the accompanying drawings, in which:

Figure 3 is a section through the novel supply reservoir; and

Figure 4 is a section through the novel simplified master cylinder.

Figure 1:
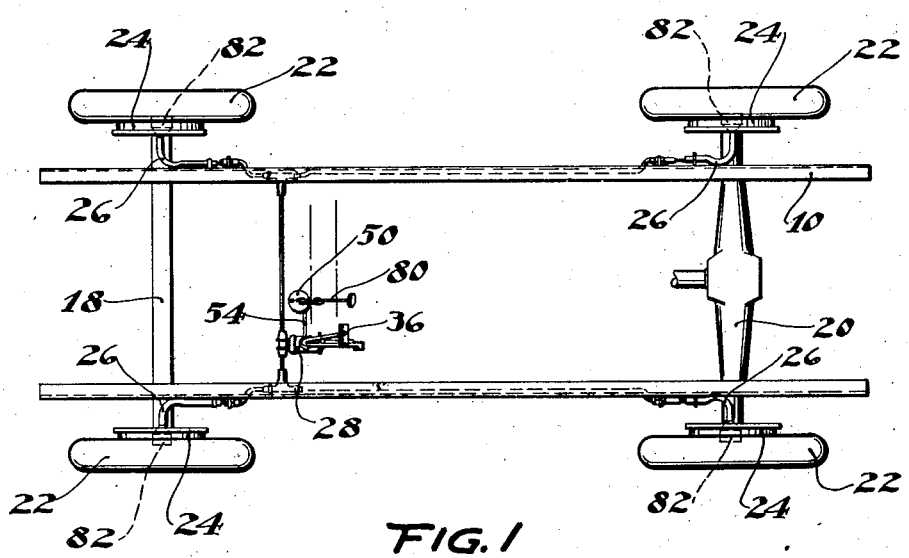
Figure 1 is a top plan view of an automobile chassis having a four-wheel hydraulic brake system embodying the invention.
Figure 2:
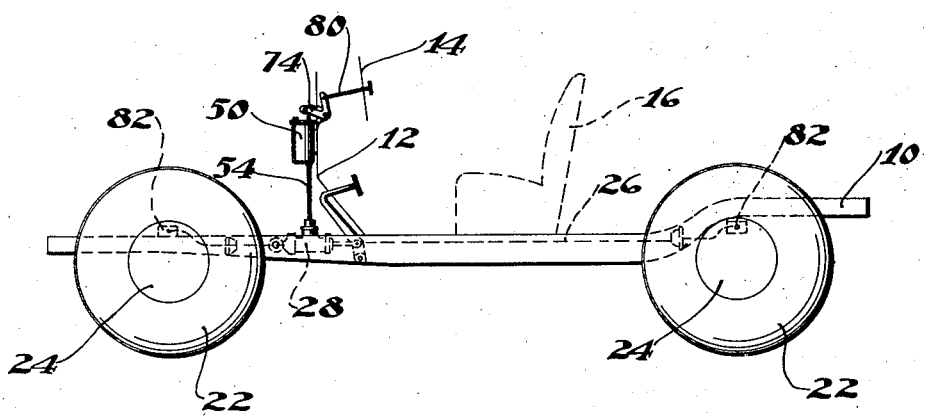
Figure 2 is a side elevation of the chassis.

The illustrated chassis includes a frame 10 carrying a dash 12, an instrument board 14, and a driver's seat 16, and supported by the usual springs on a front axle 18 and a rear axle 20. The axles are carried by road wheels 22 having hydraulic brakes 24 connected by conduits 26 with a centrally-arranged novel master cylinder 28 containing a piston 30 actuated against the resistance of a return spring 32 by means such as a piston rod 34 connected to the service brake pedal 36. The return spring 32 is arranged inside the cylinder ahead of the piston and holds a rubber packing cup 38 against the head of the piston.

According to one feature of the invention, the piston is turned down or otherwise formed with an annular chamber 40 between its ends, while the cylinder is formed with an inlet 42 having two branches, one branch 44 being in continuous unrestricted communication with the annular chamber 40 while the other branch 46 is in unrestricted communication with the interior of the cylinder 28 just ahead of the brake-released position of piston 30. The head of piston 30 is formed with grooves 48 affording one-way communication from chamber 40 to the space ahead of the piston, the rubber packing 38 serving in effect as a check valve.

By this arrangement, if piston 30 returns faster than the wheel pistons, thereby tending to create a vacuum ahead of piston 30 which might suck air into the system somewhere, liquid enters through passages 48, under pressure (as hereinafter explained), thereby preventing any vacuum. When the piston 30 reaches its released position, as shown in Figure 4, as the wheel pistons complete their release strokes the excess liquid rises back through passage 46.

A novel supply reservoir 50, having a suitable filler opening 52, is mounted above the master cylinder 28, preferably on the front of the dash 12, and is connected to the cylinder inlet 42 by means such as a conduit 54.

Inside the reservoir 50 is formed a suitable pump cylinder 56, the reservoir proper opening into the lower end of the pump cylinder through a spring-pressed ball check valve 58 (or an equivalent device) and the pump cylinder outlet communicating with the conduit 54 through a similar check valve 60.

Arranged within the cylinder 56 is a pressure member such as a piston 62, urged downwardly by means such as a coil spring 64, and having a piston rod 66 extending through the top of the reseryoir and shown with a head having a transverse slot 68. There may be an opening 70 in the filler cap and an opening 72 in the top of cylinder 56, if desired, to insure atmospheric pressure in the reservoir proper and above the piston 62; either or both of these openings may, however, be omitted, more particularly opening 72.

A bell crank lever 74 having a pin 76 in the slot 68 is shown fulcrumed on a pivot 78 on a bracket carried by the dash, and there is also shown a lengthwise-movable operating rod 80 pivoted to the bell crank lever and extending through the instrument board to a position within easy reach of the driver.

In operation, the driver pulls out the rod 80 as far as it will go, compressing the spring 64, for example to ten pounds. This pressure is then maintained on the fluid in cylinder 56, in conduit 54, in passages 44 and 46, in chamber 40, in cylinder 28, and in the fluid lines 26, as well as in the brake-operating cylinders 82 which are not shown in detail.

If leakage occurs, as usually happens very gradually, rod 80 is moved in by spring 64 as the piston 62 replaces the fluid so lost. As soon as the driver notices this, he pulls rod 80 out again, thereby sucking more liquid through valve 58. When the reservoir 50 is empty, the driver can tell this by the fact that rod 80 will not stay out when he lets go of it, whereby he knows it is time to refill the reservoir.

If it is desired to "bleed" the lines, i. e., refill them with fresh liquid, one by one the usual manually-controlled valves (not shown) in wheel cylinders are opened, and rod 80 is manipulated to pump fresh liquid through the lines.

While one illustrative embodiment has been illustrated in detail, it is not my intention to limit the scope of the invention to that particular embodiment, or otherwise than by the terms of the appended claims.

The invention of the present application is from one point of view to be regarded as a modification of the inventions of applications Nos. 497,383 and 499,921, and it is not my intention to claim herein any subject-matter of those applications.

I claim:

1. A brake system for an automobile having a dash comprising wheel brakes, a master cylinder, connections between said master cylinder and said wheel brakes, a supply reservoir, a conduit connecting said supply reservoir and said master cylinder, a pump positioned in said supply reservoir, a piston forming a part of said pump, a spring bearing upon said piston, a handle protruding through said dash, and means for connecting said handle to said piston.

2. A brake system for an automobile having a dash comprising wheel brakes, a master cylinder, connections between said master cylinder and said wheel brakes, a supply reservoir, a conduit connecting said supply reservoir and said master cylinder, a pump positioned in said supply reservoir, a piston forming a part of said pump, a spring bearing upon said piston, a reciprocating rod connected to said piston, a bell crank lever, a pin and slot connection connecting one end of said lever to one end of said rod, and a handle pivotally connected to the other end of said bell crank lever and protruding through said dash.

JOHN P. MAHONEY.